Patented June 8, 1948

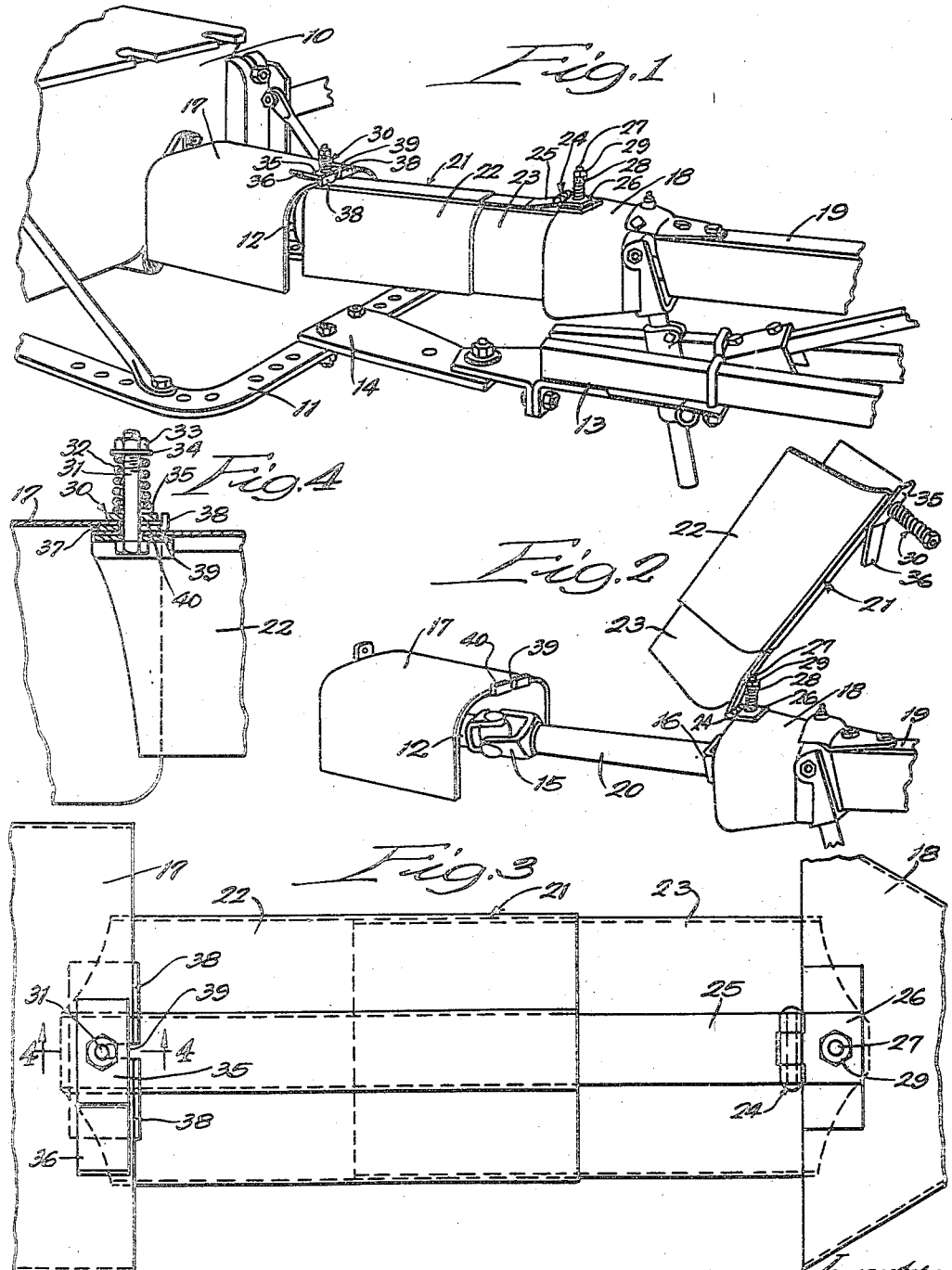

2,443,035

UNITED STATES PATENT OFFICE 2,443,035

SAFETY SHIELD FOR TRACTOR POWER TAKE-OFFS

Lloyd A. Hardy, Cambridge, Ill., assignor to International Harvester Company, a corporation of New Jersey Application October 27, 1945, Serial No. 625,025

11 Claims. (Cl. 64—3)

1

The present invention relates to a new and improved safety shield for tractor power take-offs and has for one of its principal objects the provision of means whereby the safety shield is adapted to be temporarily swung out of position in order to make attachments and detachments from the tractor.

At the present time tractor trailing implements generally receive their power from a rear power take-off shaft on the tractor which extends rearwardly to drive the trailing implement. This power take-off drive shaft is normally equipped with at least two universal joints to permit continuous driving of the implement even during a turning of the tractor.

Safety shields are provided as regular equipment with the sale of tractors and implements, and therefore, if the user desires to protect himself from the rotating drive shaft, he need only keep the safety shield in its proper position above the drive shaft. It has been found, however, that the user or operator is not mainly concerned with his own safety but rather desires speed of assembling and disassembling the tractor trailing implements from the tractor. As a result, the safety shields are generally left in the tool shed and many accidents occur. It is therefore a primary object of this invention to provide a safety shield that will not necessitate its entire removal during assembly operations and one that will automatically resume its safety covering position even though the user negligently leaves it in an open position.

An important object of this invention is to provide a safety shield for tractor power take-off shafts being hinged at one end thereof.

Another and further important object of this invention is to provide a telescoping safety shield for rotating shafts.

Other and further important objects of the invention will become apparent from the disclosures in the following specification and accompanying drawing, in which:

Figure 1 is a perspective view of the safety shield of this invention mounted in operating position;

Figure 2 is a perspective view of the safety shield of this invention swung upwardly;

Figure 3 is a top plan view of the safety shield assembly as shown in Figure 1; and Figure 4 is a sectional view taken along the line 4—4 of Figure 3.

As shown in the drawing:

The reference numeral 10 indicates generally a tractor of the agricultural type adapted to draw farm implements. The tractor 10 is provided with a draw-bar 11 and a power take-off shaft 12. A hitch part 13 of an implement such as a harvester thresher, a windrow harvester, a corn picker, or any one of a number of tractor trail-behind farm implements is attached at 14 to the tractor draw-bar 11. It is quite often the case that the trailing implements require a source of driving power and hence it is necessary to extend the power take-off drive shaft 12 of the tractor 10 rearwardly to impart drive to the elements to be driven in the trailing implement. This extended power take-off shaft is necessarily provided with a pair of universal joints 15 and 16 to give the drive shaft sufficient flexibility, thus enabling the implement to continue driving during turning of the tractor. The operator of a tractor with a trailing implement is very often required to get down from his position on the tractor and make adjustments or clean out parts on the trailing implement. In order to make some of these adjustments and clean out the machine, it is necessary to leave the tractor power take-off shaft turning in order to facilitate such adjustment and clean-out. If this power take-off shaft with the pair of universal joints 15 and 16 were unguarded, they would indeed create a hazard to the workman. Every year many farmers lose their lives, an arm, or a leg, simply because the rotative parts of farm machinery are not properly shielded. Of course, there are many lesser accidents, such as tearing of clothing, which are not so serious, but if they could be eliminated it would be a great satisfaction to the manufacturers of farm machinery.

A shield 17 is fixedly attached to the tractor 10 and covers the power take-off stub shaft 12 extending rearwardly from the tractor. Another fixed shield 18 is provided on the trailing implement above the hitch part 13. This shield 18 has an extension 19 progressing rearwardly to a point where the drive shaft is carried into the trailing machine. In between these fixed shields 17 and 18 is a space which varies in length and which must readily be accessible to the operator for lubricating and attaching and detaching of the rearwardly extending drive shaft 20 to and from the tractor power take-off shaft 12.

Ordinarily, a simple telescoping shield is arranged to cover the drive shaft between the fixed shields 17 and 18. The means for attaching this simple shield took the form of bolts, and it was necessary to remove the bolt from both ends of the shield in order to remove this shield and give access to the drive shaft 20 therebeneath. Such a device was inconvenient and the operator usually removed the shield at once and left it off. The present shield 21 incorporates the telescopic features of the formerly used safety shield and has an outer part 22 and an inner part 23. The inner part 23 is attached to the fixed shield 18 on the implement by means of a hinge 24. The portion 25 of the hinge 24 is fixed rigidly to the inner telescoping portion 23 of the shield 21. The portion 26 of the hinge 24 is yieldably mounted on the fixed shield 18. This yieldable mounting comprises a bolt 27 projecting upwardly through the fixed shield 18 and through the portion 26 of the hinge 24. A coil spring 28 surrounds the projecting portion of the bolt 27 and a nut 29 is adapted to engage the bolt 27 and also engage the spring 28 for creating adjustable tension on the portion 26 of the hinge 24. Ordinarily the hinge 24 remains in a relatively flat position. However, if it is necessary for the shield to move upwardly during a turning of the tractor or possibly at some time during travel over rough ground, the hinge 26 is capable of moving upwardly against the action of the spring 28.

The shield 21 has its upper telescoping part 22 equipped with a latch member 30, as best shown in Figure 4. The latch 30 is designed to hold the shield portion 22 in fixed relationship with respect to the stationary shield 17 on the tractor 10. As shown in Figure 4, the telescoping portion 22 supports a vertical bolt 31 very similar to the bolt 27 attaching the hinge 24 to the stationary shield 18 on the implement. A coil spring 32 surrounds the bolt 31 and is maintained in position by a bolt or nut 33 and washer 34. The lower end of the spring 32 rests on and acts against a lock member 35. This lock member 35, as shown in Figure 1, has an upwardly inclined handle portion 36 capable of being gripped for causing rotation of the lock member about the bolt 31. A cooperating latch member is provided on the shield 17 and includes an auxiliary piece of material 37 welded or otherwise attached beneath the stationary shield 17 with an upwardly extending flange 38 at the rear end of the shield 17. As shown in Figures 1, 2, and 3, the element 37 is slotted at 39. The slot projects outwardly through the flange 38 and permits a sliding of the bolt 31 therein. In attaching the shield portion 22 to the stationary shield 17, the portion 22 with its upright bolt member 31 is telescopically extended with respect to the portion 23 into the slot 39 in the member 37 having the flange 38. The slot 39 is supplemented with an alined slot 40 in the stationary shield 17. During extension of the shield portion 22 and its unitary bolt 31 into the slot 39, it is necessary to raise the lock member 35 by lifting up the handle portion 36 thus riding over the up-turned flanges 38. When the shield is attached, as shown in Figures 1, 3, and 4, the lock member 35 maintains the shield in fixed position until such time as it is raised and permitted rearward movement over the up-turned flange 38. As in the case of the opposite or hinged end when traveling over rough terrain, the shield portion 22 may move downwardly against the action of the spring 32. The latch means including the latch member or element on the swingable shield and the cooperating latch member on the stationary shield provide for releasable attachment of the swinging and stationary shields.

In order to gain access to the drive shaft 20, the operation includes several simple steps. The latch 30 is disengaged by raising the lock member 35 to a height above the flange 38, at which time the telescoping shield 21 is collapsed thereupon pulling the outer portion 22 from its position beneath the stationary shield 17 on the tractor. The shield may then be raised about its hinge 24 and in its upper position, as shown in Figure 2, the inner telescopic portion 23 rests on the bolt 27 which supports the hinge member 26. The operator now has complete access to the drive shaft 20 and may either attach or detach the drive shaft 20 from the tractor power take-off shaft 12. It will be noted that at all times the shield 21 is not removed from the implement but remains in an upwardly swung position, as shown in Figure 2. The operator is not apt to remove the nut 29 from the bolt 27 and completely remove the shield 21. In fact, he is warned against such removal, and further the bolt 27 may be equipped with a means for preventing removal of the nut 29. Regardless of this particular point, the operator attempting to reach the drive shaft 20 will take the path of least resistance and will swing the shield 21 about its hinge 24 and will not remove the shield 21 from the implement. Prior to resuming operation of the tractor drawn implement, the shield 21 should be swing down into position for engagement of the latch 30 with the stationary shield 17 on the tractor. However, it is one of the important features of this invention to provide for an automatic dropping of the shield into position over the drive shaft 20 immediately upon starting forward movement of the tractor and implement. This is accomplished by the precarious balancing of the shield 21 in this upward position, as shown in Figure 2, and hence as soon as any jarring occurs, such as initial forward movement of the tractor, the shield 21 falls forwardly into its drive shaft covering position.

It will be seen that herein is provided a safety shield for the protection of operators of tractor drawn farm implements, and it is the intention not to limit the scope of the patent otherwise than as necessitated by the appended claims.

What is claimed is:

1. A safety device for a drive shaft extending between a tractor and a trailing implement comprising, a shield, hinge means for attaching said shield to the trailing implement, and latch means including a latch member connected to the shield and a cooperating latch member connected to the tractor for removably attaching said shield to the tractor.

2. A safety device for a drive shaft extending between a tractor and a trailing implement comprising, a fixed shield on the tractor and a spaced apart fixed shield on the implement, a shield hinged for upward swinging movement to one of said fixed shields, and latch means for attaching the other end of said hinged shield to the other of the fixed shields, said latch means including a latch member connected to the hinged shield and a cooperating latch member connected to one of the fixed shields.

3. A safety device for a drive shaft extending between a tractor and a trailing implement comprising a fixed shield on the tractor and a spaced apart fixed shield on the implement, a telescopic shield hinged for upward swinging movement to one of said fixed shields, and latch means for attaching the other end of said hinged shield to the other of the fixed shields, said latch means including a latch member connected to said hinged shield and a cooperating latch member connected to the other of the fixed shields.

4. A covering for a drive shaft extending between a tractor and a trailing implement comprising a fixed shield on the tractor and a spaced apart fixed shield on the implement, a telescopic shield hinged at one end to the fixed shield on the implement for vertical swinging movement, and means for latching and unlatching the other end of the telescopic shield to said fixed shield on the tractor including a latch member connected to the hinged shield and a cooperating latch member connected to the fixed shield on the tractor.

5. A covering for a drive shaft extending between a tractor and a trailing implement comprising a fixed shield on the tractor and a spaced apart fixed shield on the implement, a telescopic shield having a spring-mounted hinge connection to one of said fixed shields, and means for latching and unlatching the other end of the telescopic shield on the other of the fixed shields, said latch means including a latch member connected to said hinged shield and a cooperating latch member connected to the other of the fixed shields.

6. A covering for a drive shaft extending between a tractor and a trailing implement comprising a fixed shield on the tractor and a spaced apart fixed shield on the implement, a telescopic shield having a spring-mounted hinge connection to one of said fixed shields, said spring-mounted hinge including a bolt projecting upwardly from said fixed shield and forming a part thereof, a hinge part loosely engaging said bolt, a spring surrounding said bolt and tending to force said hinge part downwardly, and means for latching and unlatching the other end of the telescopic shield on the other of the fixed shields, said latch means including a latch member connected to said hinged shield and a cooperating latch member connected to the other of the fixed shields.

7. A covering for a drive shaft extending between a tractor and a trailing implement comprising a fixed shield on the tractor and a spaced apart fixed shield on the implement, a telescopic shield having a spring-mounted hinge connection to one of said fixed shields, said spring-mounted hinge including a bolt projecting upwardly from said fixed shield and forming a part thereof, a hinged part loosely engaging said bolt, a spring surrounding said bolt and tending to force said hinge part downwardly, a nut engaging the upper end of said bolt and providing adjustable compression on said spring, and means for latching and unlatching the other end of the telescopic shield on the other of the fixed shields, said latch means including a latch member connected to said hinged shield and a cooperating latch member connected to the other of the fixed shields.

8. Protective shielding for a power shaft connection between two coupled vehicles, comprising in combination, a pair of fixed shields mounted on said vehicles, respectively, adapted to be disposed in aligned, spaced relation, an interconnecting shield structure between said pair of shields, said structure permanently connected to one of said fixed vehicle mounted shields, and disengageable means connecting said interconnecting shield structure with the other of said vehicle mounted shields.

9. Protective shielding for a power shaft connection between two coupled vehicles, comprising in combination, a pair of fixed shields mounted on said vehicles, respectively, adapted to be disposed in aligned, spaced relation, an interconnecting shield structure between said pair of shields, said structure permanently connected to one of said vehicle mounted shields, said shield structure including a shield shiftable to and away from one of the fixed vehicle mounted shields, and disengageable means connecting said interconnecting shield structure with the other of said fixed vehicle mounted shields.

10. Protective shielding for a power shaft connection between two coupled vehicles, comprising in combination, a pair of fixed shields mounted on said vehicles, respectively, adapted to be disposed in aligned, spaced relation, an interconnecting shield structure between said pair of shields, said structure permanently connected to one of said vehicle mounted shields, said shield structure including a shield shiftable to and away from one of the fixed vehicle mounted shields, disengageable means connecting said interconnecting shield structure with the other of said fixed vehicle mounted shields, and means cooperating with the disengageable means constructed and provided for lateral swinging movement of the shield structure.

11. Protective shielding for a power shaft connection between two coupled vehicles, comprising in combination, a pair of shields mounted on said vehicles, respectively, adapted to be disposed in aligned, spaced relation, an interconnecting shield between said pair of shields, means permanently connecting said interconnecting shield to one of said vehicle mounted shields providing for longitudinal shifting and lateral swinging movement of said interconnecting shield relative thereto, and disengageable means connecting said interconnecting shield with the other of said vehicle mounted shields.

LLOYD A. HARDY.

REFERENCES CITED

The following references are of record in the file of this patent:

UNITED STATES PATENTS

| Number | Name | Date |
|---|---|---|
| 1,387,553 | Miller | Aug. 16, 1921 |
| 2,410,503 | Johnson | Nov. 5, 1946 |